(12) United States Patent
Kogel et al.

(10) Patent No.: US 7,735,595 B2
(45) Date of Patent: Jun. 15, 2010

(54) HYDRAULIC POWER STEERING

(75) Inventors: Walter Kogel, Abtsgmuend (DE); Andreas Braun, Waeschenbeuren (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 459 days.

(21) Appl. No.: 11/654,441

(22) Filed: Jan. 17, 2007

(65) Prior Publication Data
US 2007/0193817 A1   Aug. 23, 2007

(30) Foreign Application Priority Data
Jan. 31, 2006   (DE) .................. 10 2006 004 315

(51) Int. Cl.
*B62D 5/06* (2006.01)
(52) U.S. Cl. .................. 180/405; 180/403
(58) Field of Classification Search .......... 180/403, 180/405
See application file for complete search history.

(56) References Cited

U.S. PATENT DOCUMENTS

| | | | | |
|---|---|---|---|---|
| 5,893,427 A | * | 4/1999 | Bohner et al. ........... | 180/403 |
| 6,382,342 B1 | * | 5/2002 | Peppler .................. | 180/407 |
| 6,502,661 B1 | * | 1/2003 | Heitzer ................. | 180/403 |
| 7,322,439 B2 | * | 1/2008 | Hara et al. ............. | 180/402 |
| 2004/0238258 A1 | * | 12/2004 | Ono et al. .............. | 180/402 |
| 2006/0272882 A1 | * | 12/2006 | Chino et al. ........... | 180/405 |

FOREIGN PATENT DOCUMENTS

| | | |
|---|---|---|
| DE | 38 08 900 | 9/1989 |
| DE | 43 07 864 | 9/1994 |
| DE | 196 03 270 | 7/1997 |
| DE | 299 15 179 | 1/2000 |
| DE | 102 56 306 | 10/2003 |
| DE | 10 2004 007 833 | 9/2005 |

* cited by examiner

*Primary Examiner*—Lesley Morris
*Assistant Examiner*—Michael R Stabley
(74) *Attorney, Agent, or Firm*—Jordan and Hamburg LLP

(57) ABSTRACT

A hydraulic power steering system for a vehicle includes a first, hydraulic actuator for making available steering power or auxiliary steering power for adjusting the steering angle of one or more steered wheels of the vehicle, and with a second electric actuator for making available a steering power or auxiliary steering power for adjusting the steering angle of the steered wheel. For a power steering system, for which the power dissipated is reduced and the operating temperature lowered, the first hydraulic actuator can be taken out of operation while the vehicle is being driven as a function of the trip and/or vehicle parameters.

18 Claims, 2 Drawing Sheets

HYDRAULIC POWER STEERING

BACKGROUND OF THE INVENTION

The invention relates to a hydraulic power steering system.

Passenger cars and commercial vehicles of today usually are equipped with hydraulic or electrohydraulic power steering. The steering process of a driver is supported by the force produced by an actuator. The hydraulic energy is produced by a pump, which is driven permanently by the internal combustion engine of a motor vehicle. The pump output must be designed so that large steering angle changes can be carried out in a short time at low revolutions of the engine when the vehicle is stationary. On the other hand, when driving at higher speeds, a comparatively low steering energy is required, so that the pump and the steering system are overdimensioned in this case. This leads to a considerable dissipation of power in the steering system, which is reflected in an increased temperature of the pressure medium.

Supporting the moment or boosting the steering as a function of the speed is known.

DE 38 08 900 A1 describes a steering system for a motor vehicle with a hydraulic pump, which is driven by an electric motor and acts upon a steering cylinder by way of a steering valve. The electric motor and the hydraulic pump are activated only upon input of a nominal steering angle at a steering handle of the motor vehicle and otherwise are switched off in order to save energy.

DE 43 07 864 A1 describes a power steering system for motor vehicles with a hydraulic pump, which is driven by an electric motor and which can be connected over hydraulic lines by means of a control valve with at least one working chamber of a hydraulic cylinder, which is coupled to a mechanical steering system to support the steering power. When no steering support is required, the electric motor is operated with reduced power in a stand-by mode. When steering support is required, the electric motor is operated in an operating mode.

DE 102 56 306 A1 discloses a hydraulic power steering system for a vehicle with a steering gear and with a first hydraulic actuator for supporting the operation of a steering handle by a driver in order to bring about a shift in the steering angle of steered wheels of a vehicle. In order to bring about a functional gain in the hydraulic power steering with the aim of varying the amplification performance curve of the power steering, a second, preferably electric actuator is added, which is constructed as a steering shaft actuator.

The known electrical power steering systems are not suitable for commercial vehicles, since the electric power required is not adequate. When a second actuator is added to a hydraulic power steering system, the power required by the hydraulic steering system basically is not reduced, since the first actuator and its supplying source of pressure medium remain in operation constantly, so that the known power steering systems either are unsuitable for commercial vehicles or do not have any structural distinguishing features for clearly reducing the energy required during their operation.

SUMMARY OF THE INVENTION

It is an object of the invention to indicate a power steering system, for which the power dissipation is reduced and the operating temperature is lowered.

Owing to the fact that, depending on the driving parameters and vehicle parameters, the first hydraulic actuator, while the vehicle is traveling, can be brought into an inoperative state, in which no power is taken up and in which exclusively the second actuator makes steering power or auxiliary steering power available, a structural measure has been taken for reducing clearly the energy consumed by the hydraulic power steering system when little steering power is required, for example, when the vehicle is traveling straight ahead.

The second actuator of the hydraulic power steering system preferably is an electric actuator, which requires less energy, preferably significantly less energy, than does a first hydraulic actuator with its pressure medium pump.

A controlling and/or regulating device ECU controls the second electric actuator. The controlling and/or regulating device evaluates at least signals of a steering moment sensor and of a rotor position sensor of the electric actuator. Preferably, the controlling and regulating device is co-enlisted to switch the first, hydraulic actuator on and off.

In a first example of the hydraulic power steering system, the first hydraulic actuator can be switched on and off by switching off the pressure medium pumping device. Suitable as a pressure medium pumping device is a pump with a variable pumping capacity, such as a vane-type pump, the displacement of which can be reduced to zero in order to switch off the hydraulic actuator.

With the help of the controlling and regulating device, it may also be appropriate, when the steering moment at the steering handle of a vehicle is slight, to open a bypass valve between a pressure line and a return line of the pressure medium pumping device in order to switch off the first hydraulic actuator with a short circuit in the pressure medium pumping system.

The first hydraulic actuator is controlled by the ECU preferably as a function of the driving parameters, such as the driving speed of the vehicle. The first hydraulic actuator can be switched off only when a lower speed limit is exceeded. The yaw rate of the vehicle or the transverse acceleration may be additional determinants of the ECU, on the basis of which it becomes at all possible to stop the first hydraulic actuator. The steering speed and/or the steering moment, which a driver of the vehicle exerts on the steering handle, may be further determinants for making it possible to switch off the first hydraulic actuator or to put it out of operation. At high steering moments, such as those encountered when parking the vehicle, as well as during steering process with a rapid change in the steering angle, or at high steering speeds, all actuators of the hydraulic power steering system are in operation.

On the other hand, when traveling straight ahead at high speeds, for example, on an Autobahn, it is conceivable to take the first actuator out of operation, so that the hydraulic steering system requires no or only a slight amount of energy.

It may also be advantageous to use the pressure of the pressure medium into a working space of the first hydraulic actuator as a determinant for stopping the operation of the first actuator.

The second actuator may impress its regulating power or its torque preferably on an element of a steering gear, the latter being actively connected with the first hydraulic actuator.

The hydraulic power assisted steering may be disposed in a passenger car. Preferably, however, it is disposed in a commercial vehicle and constructed as a power steering system.

DESCRIPTION OF THE PREFERRED EMBODIMENTS

Figure 1:
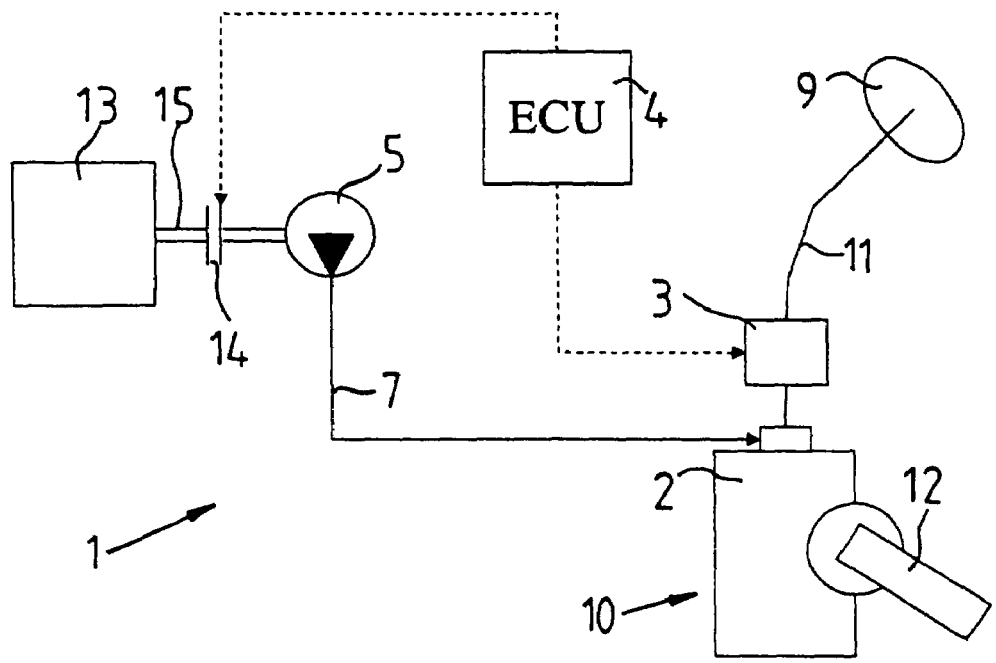
FIG. 1 shows a diagrammatic view of a hydraulic power steering system of a commercial vehicle with a switchable coupling between an internal combustion engine and a pressure medium pump driving this power steering system.

A diagrammatic view of a hydraulic power steering system 1 for a commercial vehicle is shown in FIG. 1. The hydraulic power steering system 1 reduces the steering moment, which has to be applied to a steering handle 9 in order to adjust the steering angle of steerable wheels (not shown) of the commercial vehicle and consists of the steering handle 9, which is connected torque proof with a steering shaft 11 and of a steering gear 10 with pitman arm 12, which is actively connected with the steering shaft 11. The steering gear 10 is constructed as a ball-and-nut hydraulic gear with a first hydraulic actuator 2 disposed therein. The first hydraulic actuator 2 is provided with pressure medium from a pressure medium pumping device 5, which, in turn, is driven by an internal combustion engine 13 of the commercial vehicle.

In order to save energy for the operation of the hydraulic power steering system in driving situations requiring little steering power, a second electric actuator 3, requiring less power than the first hydraulic actuator 2, is disposed at the steering gear 10. The second, electric actuator 3 is used constantly for making available an auxiliary steering moment and is controlled by a controlling and/or regulating device 4 (ECU).

The controlling and/or regulating device 4 furthermore looks after the operating state of the first, hydraulic actuator 2 in that the controlling and/or regulating device 4 engages or disengages a switchable coupling 14 at a subsidiary output shaft 15, which is driven by the internal combustion engine 13 for driving the pressure medium pumping device 5, as a result of which the power to the pressure medium pumping device is switched off and the first, hydraulic actuator 2 is taken out of operation. When the only steering power, required while the commercial vehicle is traveling, can also be supplied by the second, electric actuator, the first hydraulic actuator assumes an out of operation setting.

The steering and/or regulating device 4 operates on the basis of sensor data, which represents the actual driving speed, the actual yaw rate or transverse acceleration of the commercial vehicle, the steering moment and the actual steering speed, and on the basis of stored characteristic curves, characteristic curve families and algorithms.

Both actuators 2, 3 are in operation and support the steering activity of the driver of the commercial vehicle when much power is required for steering, for example, when parking.

Figure 2:
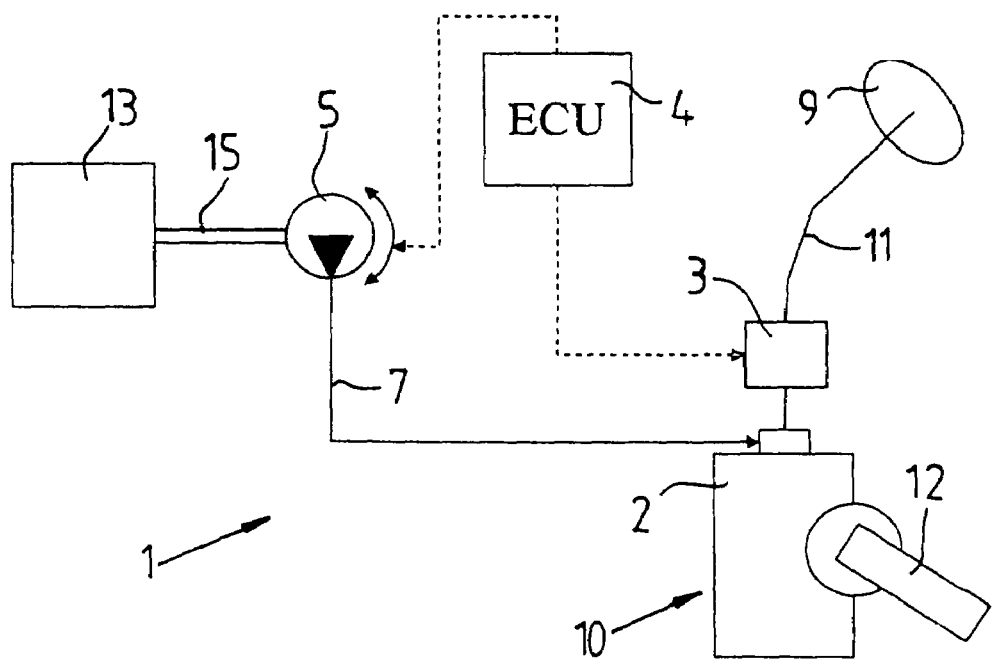
FIG. 2 shows a diagrammatic view of a hydraulic power steering system of a commercial vehicle with a pressure medium pump having a variable stroke.

FIG. 2 shows a diagrammatic view of a hydraulic power steering system of a commercial vehicle with a pressure medium pumping device 5 with a variable stroke. The same reference numbers have been used for components, which are identical with those in FIG. 1. In order to save energy for the operation of the hydraulic power steering system 1 in driving situations, in which less steering power is required, for example, when a specified driving speed is exceeded or when the steering speed and/or the steering moment are below a minimum value, provisions are made so that the controlling and/or regulating device 4 (ECU) sets the stroke of the pressure medium pumping device 5 to zero, so that the steering power of the driver is supported only by the second, electric actuator 3 in this driving situation and the first hydraulic actuator 2 is taken out of operation.

Figure 3:
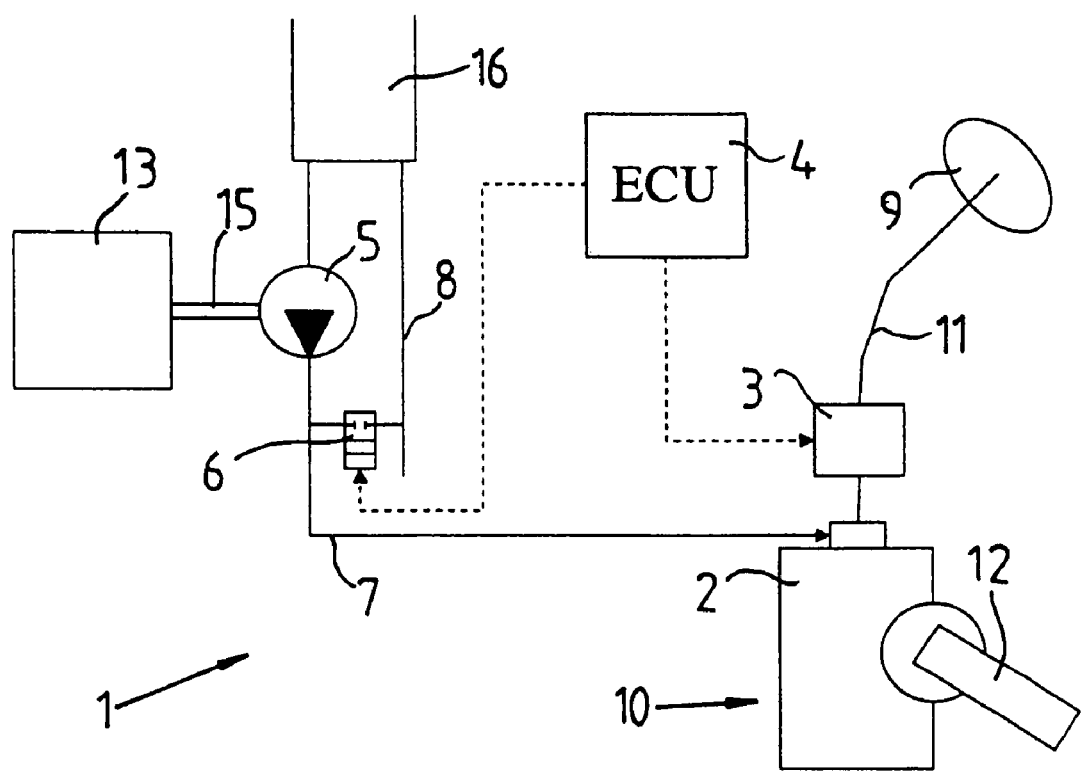
FIG. 3 shows a diagrammatic view of a hydraulic power steering system of a commercial vehicle with a bypass valve between a pressure line and a return line of the pressure medium pump.

FIG. 3 shows a diagrammatic view of a hydraulic power steering system 1 for a commercial vehicle with a bypass valve 6 between a pressure line 7 for the pressure medium to the first hydraulic actuator 2 and a return line 8 for the pressure medium to a pressure medium container 16. The same reference numbers have been used for components, which are identical with those in FIGS. 1 and 2.

In order to save energy while the commercial vehicle is traveling under conditions, where little steering power is required, the first hydraulic actuator 2 is switched off by the controlling and/or regulating device 4 in that the bypass valve 6 is opened, short circuiting the pumping of pressure medium.

The structural measures, shown in FIGS. 1 to 3, may also be provided in combination with one another at a hydraulic power steering system. They all lead to a reduction in the power dissipated and in the temperature of the pressure medium during the operation of the power steering systems shown.

LIST OF REFERENCE SYMBOLS

1 Power steering system, hydraulic
2 Actuator, first
3 Actuator, second
4 Controlling and/or regulating device
5 Pressure medium pumping device
6 Bypass valve
7 Pressure line
8 Return line
9 Steering handle
10 Steering gear
11 Steering shaft
12 Pittman arm
13 Internal Combustion engine
14 Coupling, switchable
15 Subsidiary output shaft
16 Pressure medium vessel

What is claimed is:

1. A hydraulic power steering system for a vehicle, comprising:
   a first, hydraulic actuator for making available steering power or auxiliary steering power for adjusting the steering angle of a steered wheel of the vehicle; and
   a second actuator for making available a steering power or auxiliary steering power for adjusting the steering angle of the steered wheel, the first hydraulic actuator, depending on trip and/or vehicle parameters, being operable to be taken out of operation when the vehicle requires less steering power while the vehicle is being driven.

2. The hydraulic power steering system of claim 1, wherein the second actuator is an electric actuator.

3. The hydraulic power steering system of claim 2, comprising a steering gear, the first hydraulic actuator and a second electric actuator acting on the steering gear.

4. The hydraulic power steering system of claim 1, wherein the second actuator requires less energy than the first actuator.

5. The hydraulic power steering system of claim 1, wherein the operation of the first hydraulic actuator and of the second electric actuator is controlled by a controlling and/or regulating device.

6. The hydraulic power steering system of claim 1, further comprising a pressure medium pumping device for the first hydraulic actuator, the first hydraulic actuator being taken out of operation by taking the pressure medium pumping device for the first hydraulic actuator out of operation.

7. The hydraulic power steering system of claim 6, wherein the first hydraulic actuator is taken out of operation by reducing the flow of pressure medium from the pressure medium pumping device to zero.

8. The hydraulic power steering system of claim 6, further comprising a bypass valve and a pressure line with a return line, the first hydraulic actuator being taken out of operation by short circuiting by means of the bypass valve and the pressure line with the return line at the pressure medium pumping device.

9. The hydraulic power steering system of claim 1 or 5, wherein the first hydraulic actuator is taken out of operation as a function of the driving speed of the vehicle.

10. The hydraulic power steering system of claim 1 or 5, wherein the first hydraulic actuator is taken out of operation as a function of the steering speed and/or the steering moment at a steering member of the hydraulic power steering system.

11. The hydraulic power steering system of claim 1 or 5, wherein the first hydraulic actuator is taken out of operation as a function of the yaw rate and/or the transverse acceleration of the vehicle.

12. The hydraulic power steering system of claim 1 or 5, wherein the first hydraulic actuator is taken out of operation as a function of the pressure medium pressure in a working space of the first hydraulic actuator.

13. The hydraulic power steering system of claim 1, wherein the hydraulic power steering system is a power-assisted or power steering system.

14. The hydraulic power steering system of claim 1, wherein the hydraulic power steering system is used in a passenger car or a commercial vehicle.

15. A hydraulic power steering system for a vehicle, comprising:
 a first actuator for making available steering power or auxiliary steering power for adjusting the steering angle of a steered wheel of the vehicle, said first actuator being a hydraulic actuator;
 a second actuator for making a steering power or auxiliary steering power available for adjusting the steering angle of the steered wheel; and
 a device being operable to suspend operation of said first actuator while the vehicle is being driven depending on trip and/or vehicle parameters.

16. The hydraulic power steering system of claim 15, wherein the second actuator is an electric actuator.

17. The hydraulic power steering system of claim 16, wherein the second actuator requires less energy than the first actuator.

18. The hydraulic power steering system of claim 16, wherein said device suspends operation of said first actuator when the vehicle requires less steering power in order to conserve energy consumption.

* * * * *